United States Patent [19]

Propst et al.

[11] 4,184,227
[45] Jan. 22, 1980

[54] SANITARY CASTER

[76] Inventors: Robert L. Propst, 2347 Londonderry; Paul L. Propst, 2490 Laurelwood, both of Ann Arbor, Mich. 48104

[21] Appl. No.: 917,783

[22] Filed: Jun. 22, 1978

[51] Int. Cl.² .......................................... B60B 33/00
[52] U.S. Cl. ................................................ 16/35 R
[58] Field of Search ............ 16/35 R, 35 D, 45, 18 R, 16/18 A, 37, 38; 188/1 D, 69, 71.1, 72.1, 72.7

[56] References Cited

U.S. PATENT DOCUMENTS

| | | | |
|---|---|---|---|
| 2,421,464 | 6/1947 | Reiner | 16/35 R |
| 3,177,516 | 4/1965 | Price et al. | 16/18 A |
| 3,988,800 | 11/1976 | Sachser | 16/35 R |

FOREIGN PATENT DOCUMENTS

| | | | |
|---|---|---|---|
| 2203919 | 8/1973 | Fed. Rep. of Germany | 16/35 R |
| 2520097 | 11/1976 | Fed. Rep. of Germany | 16/35 R |

*Primary Examiner*—George H. Krizmanich
*Attorney, Agent, or Firm*—Olsen and Stephenson

[57] ABSTRACT

A caster adapted for use in hygienic environments consisting of a caster body rotatably supporting a caster wheel and having an upright bore which receives a spindle member to provide for the rotation of the caster body with respect to the spindle member. A spindle-locking mechanism is positioned within the bore and is movable between a release position enabling rotation of the caster body with respect to the spindle member and a lock position in which the caster body is maintained in a fixed position relative to the spindle member.

13 Claims, 7 Drawing Figures

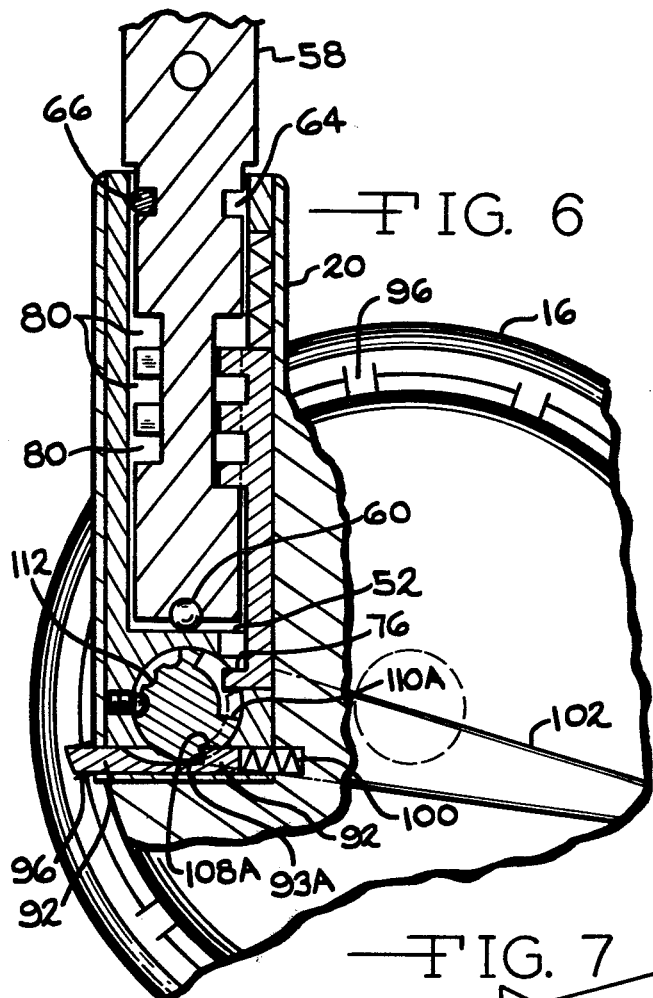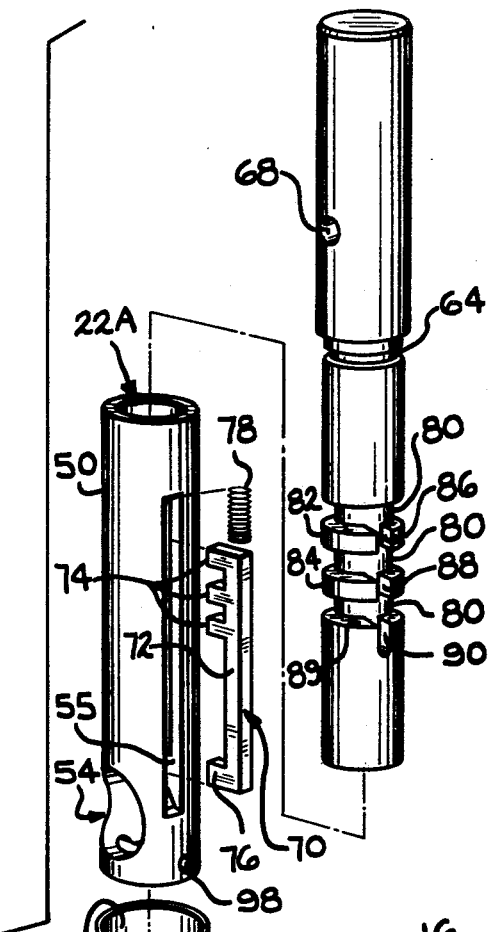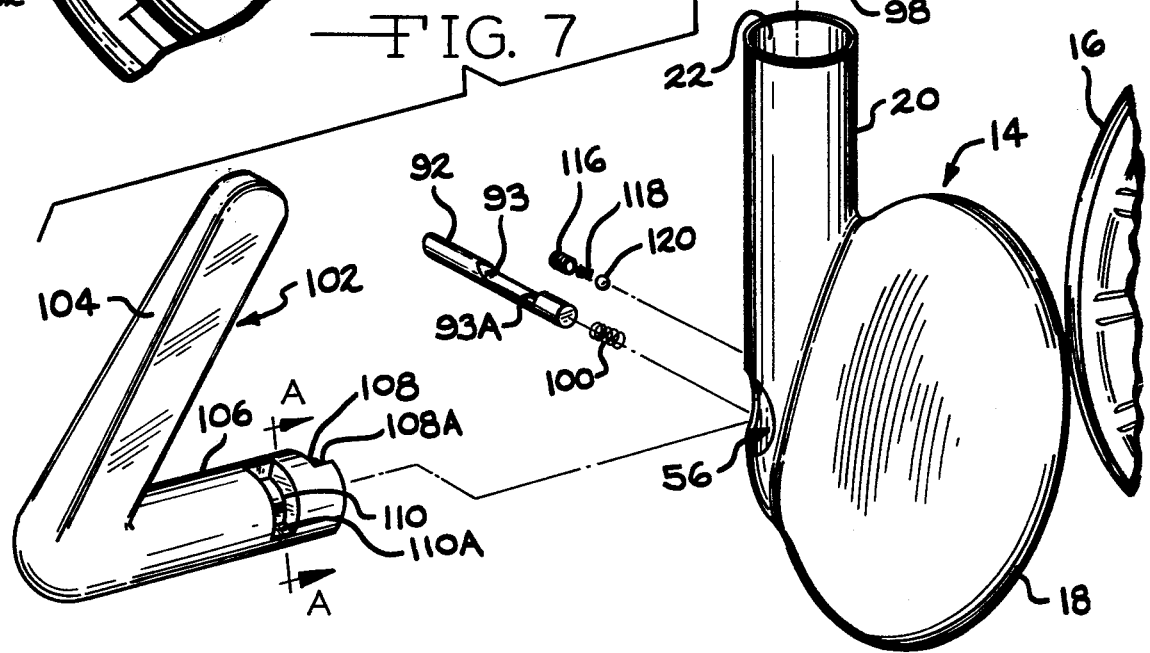

SANITARY CASTER

BACKGROUND OF THE INVENTION

The present invention relates to a caster which has both a spindle-locking mechanism and a braking mechanism and which is especially constructed for use in environments where sanitary conditions must be maintained. Casters have been developed which are equipped with both spindle-locking and wheel-braking systems. These casters tend to have either such a complicated construction so as to be excessively costly with no assurance of a durable service life or they are equipped with spindle-locking and wheel-braking systems that are exposed to the environment rendering these casters unsuitable for use in clean environments, such as hospitals for example. Moreover, it has been difficult to equip a sanitary caster with a braking system that positively engages the caster wheel as most casters are provided with friction-type braking systems.

It is the general object of the present invention, therefore, to provide a caster for use in environments in which a high level of cleanliness must be maintained.

It is another object of the present invention to provide a caster with internally located spindle-locking and wheel-braking systems.

It is another object of the present invention to provide a caster having a wheel-braking system actuatable to positively engage the caster wheel.

It is another object of the present invention to provide a caster having spindle-locking and wheel-braking mechanisms that are actuatable by a single operating member.

It is another object of the present invention to provide a caster constructed so that it can be easily cleaned.

SUMMARY OF THE INVENTION

In accordance with the present invention, a sanitary caster is provided consisting of a caster body having a main body portion formed to a generally biconvex shape and a rear sleeve portion having an upright bore which coaxially receives a spindle member so that the caster body is rotatable with respect to the spindle. The main body portion is inclined with respect to the sleeve portion and rotatably supports a caster wheel so that its axis of rotation is inclined.

The caster wheel is cup-shaped having a generally laterally-extending wheel rim and is mounted on the downwardly-facing side of the main body portion so that the outer edge of the wheel rim is in alignment with the outer edge of the biconvex body portion. A small clearance is provided between the caster body and the caster wheel which checks the introduction of dirt or other foreign matter into the spaces between the caster body and the caster wheel. Yet, by virtue of the tilted position of the caster wheel, a stream of cleaning fluid can be easily directed at the clearance between the caster body and the caster wheel to wash out the regions therebetween without moving the caster to a special orientation. The interior of the caster wheel is also configured to promote the drainage of any liquid from the caster.

A spindle-locking mechanism is disposed in the sleeve portion of the caster body and is movable axially of the spindle member between a lock position in which the caster body is maintained in a fixed position with respect to the spindle member so that the caster can travel only in a straight path and a release position in which the rotation of the caster body is unconstrained. The spindle-locking mechanism includes a lock member movably disposed in the sleeve portion of the caster body so as to be movable only in directions extending axially with respect to the spindle member. The lock member has teeth that extend radially inwardly towards the spindle member and are positioned in circumferential grooves in the spindle member in the release position to enable relative rotation between the spindle member and the caster body. Locking the spindle member is achieved by movement of the lock member axially of the spindle member to a position locating the teeth in slots formed in the spindle member that are positioned axially of the grooves.

A positive wheel-braking mechanism is provided consisting of a pin member located at the rear portion of the caster body and is movable between extended and retracted positions. The inner surface of the wheel rim of the caster wheel has circumferentially spaced-apart cavities, each being adapted to receive the pin member. The pin member is extended from the caster body into one of the cavities to positively engage the wheel in its braking mode.

A single operating member controls both the spindle-locking and braking mechanisms. In a first position of the operating member, the spindle-locking and braking mechanisms are actuated so that rotation of the caster body with respect to the spindle member and rotation of the caster wheel are unconstrained. In a second position of the operating member, the spindle-locking mechanism is actuated to restrain rotation of the caster body with respect to the spindle member while the caster wheel can freely rotate. In the third position of the operating member the spindle-locking mechanism is actuated to restrain rotation of the caster body with respect to the spindle member and the brake mechanism is actuated to arrest the rotation of the caster wheel.

Further objects, features, and advantages of the present invention will become apparent from a consideration of the following description when taken in connection with the appended claims and the accompanying drawing in which:

FIG. 6 is a side elevational view like FIG. 5, but showing the brake mechanism in a brake position; and FIG. 7 is an exploded perspective view of the components of the sanitary caster of this invention.

DETAILED DESCRIPTION OF THE PREFERRED EMBODIMENT

Figure 1:
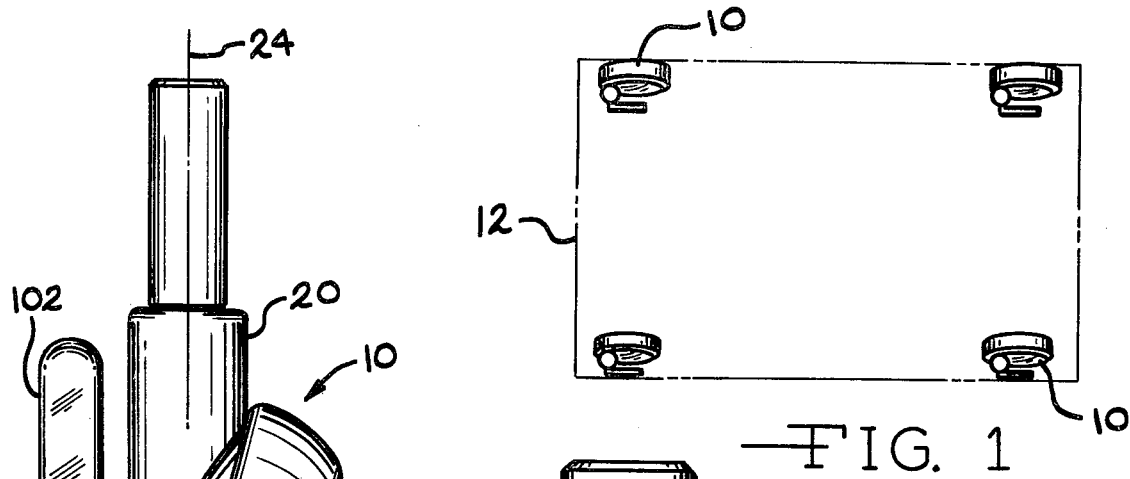
FIG. 1 is a schematic top plan view of a caster-supported cart showing the relative positions of four casters of the present invention.
Figure 2:
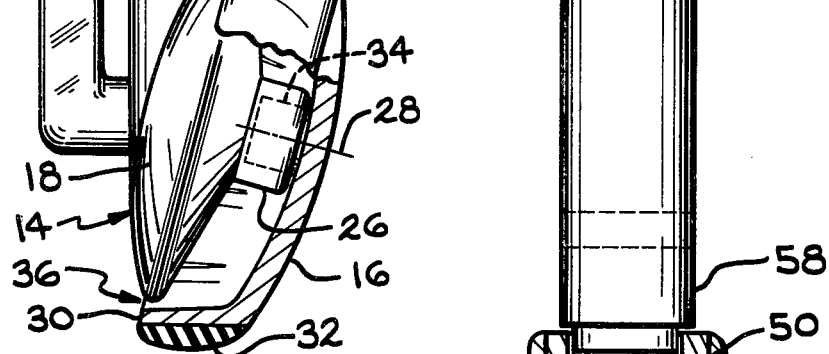
FIG. 2 is a front elevational view of the sanitary caster of the present invention with a portion of the caster wheel broken away.

Referring to the drawing, the sanitary caster of the present invention, indicated generally at 10 in FIG. 2, is especially suited for use in environments in which sanitary conditions must be maintained. A material-handling cart 12 is shown in FIG. 1 supported at each corner by a caster 10.

The caster 10, as seen in FIG. 2, consists of a caster body 14 rotatably supporting a caster wheel 16. The caster body 14 includes a main portion 18 formed having a generally bicovex configuration and a sleeve portion 20 located rearwardly of and formed integrally with the body portion 18. An upright bore 22 (FIG. 7) having an axis 24 about which the caster body 14 is rotatable, is formed in the body 14. The main body portion 18 is inclined with respect to the axis 24 and has wheel-mounting means located on its downwardly-facing side for supporting the caster wheel 16 so that its axis of rotation 28 is inclined downwardly with respect to the axis 24.

The caster wheel 16 is generally cup-shaped having a disk portion 29 from which a generally circular wheel rim 30 extends. A continuous band of rubber 32 or similar man-made material encircles the outer surface of the wheel rim 30 for augmenting traction of the wheel 16 on a floor or similar supporting surface and for enhancing quiet operation of the caster 10 as it travels over the floor. An axle 34 is mounted on the disk portion 29 concentrically with respect to the wheel rim 30 and is received by a hub member 26 mounted on the downwardly-facing side of the body portion 18. Together the hub 26 and the axle 34 form the wheel-mounting means.

The caster wheel 16 is mounted on the caster body 14 so that the exposed edge of the wheel rim 30 is in substantial radial alignment with the periphery of the body portion 18. A clearance or space 36 is established between the wheel rim 30 and the body portion 18 and is sufficiently large to admit a jet of water or cleaning fluid to wash out the regions of the caster 10 between the body portion 18 and the wheel 16. The tilting of the body portion 18 and the wheel 16 facilitates the cleaning process since the clearance 36 faces in an upwardly direction. The inner surface of the wheel rim 30 is angled away from the wheel axis 28 to allow for complete drainage of any liquid from the caster wheel 16. Also, by virtue of the location of the hub member 26 on the main body portion 18 to face in a downwardly direction, any accumulation of liquid therein will be avoided.

An auxiliary sleeve member 50, as seen in FIG. 7, is disposed in the bore 22 and is maintained in a fixed position relative to the caster body 14. Accordingly, the sleeve member 50 can be considered an integral portion of the caster body 14, but for purposes of ease of assembling the various components within the caster body 14, the sleeve member 50 is employed. The outer surfaces of the caster body 14 are thus essentially continuous and smooth retarding the accumulation of dirt or foreign matter thereon. The outer surface of the caster body 14 further creates a barrier against the entrance of dirt into the caster body 14.

The sleeve 50 has an internal bore 22A also having the axis 24. The bore 22A terminates at a support base wall 52. A circular transversely-extending hole 54 is formed below the wall 52 and is aligned with a side opening 56 formed in the rear sleeve portion 20 of the caster body 14 when the sleeve member 52 is disposed in the bore 22. An axial slot 55 in the sleeve member 50 is positioned to face forwardly in the sleeve portion 20 and communicates with both the bore 22A and the transversely-extending hole 54.

A spindle member 58 is rotatably disposed in the bore 22A and rides on a ball member 60 that is supported by the wall 52 to receive axially-directed loads and to minimize frictional resistance in the rotation of the caster body 14 with respect to the spindle 58. A circumferential raceway 64 having ball members 66 (one shown in FIGS. 4-6) which also lessens the effects of friction. A mounting hole 68 is also provided for mounting the spindle member 58 to the material-handling cart 12 or other article that is to be supported by the caster 10.

The caster 10 includes coacting means on the caster body 14 and on the spindle member 58 movable between a release position in which rotation of the caster body 14 about the spindle member 58 is unconstrained and a lock position in which the caster body 14 is maintained in a predetermined, fixed position relative to the spindle member 58. Brake means is also provided on the caster body 14 movable between a brake-applied position in which the brake means positively engages the caster wheel 16 and a brake-released position enabling the unconstrained rotation of the caster wheel 16 with respect to the caster body 14. As used herein, the term "positive engagement" in regards to the braking of the wheel 16 refers to braking caused by direct engagement of components as opposed to frictional engagement of a member against a wheel or component thereof to establish a braking of the wheel.

The coacting means consists of a spindle-locking mechanism including a lock member 70 (FIGS. 3-7) positioned in the slot 55 and movable therein only axially with respect to the spindle member 58. The lock member 70 has an elongated rectangular stem portion 72 that fits in the slot 55 so as to prevent twisting of the lock member 70 therein. At one end of the stem 72 projecting members or teeth 74 are formed extending radially inwardly towards the spindle member 58. The teeth 74 are spaced apart predetermined distances from each other. At the other lowermost end of the stem 74, a lateral projection 76 is provided extending in the same direction as the teeth 74. The lock member 70 is movable back and forth in the slot 55 so the projecting extension can be moved into and out of the hole 56 formed in the lower portion of the sleeve member 50. A spring 78 is interposed between the upper end of the lock member 70 and the portion of the sleeve 50 defining the upper end of the slot 55 and serves to bias the lock member 70 downwardly so that the projection 76 is biased towards the opening 56.

Axially-spaced circumferential grooves 80 are formed in the spindle member 58 and are dimensioned spaced from each other distances that correspond to the dimensioning and spacing of the teeth 74. Accordingly, spaced circular ribs 82 and 84 separate the grooves 80.

Axially-alignied slots 86 and 88 are formed in the ribs 82 and 84 and extend into the ribs 82 and 84 a depth equal to the depth of the grooves 80. Another slot 90 aligned with the slots 86 and 88 is formed in the spindle member 58 and has a depth similar to that of the slots 86 and 88. The slots 86–90 all have a width sufficient to receive the teeth 74 on the lock member 70.

As indicated above, the spring 78 urges the lock member downwardly. In the upper position or release position, the teeth 74 are located in the grooves 80 enabling the unconstrained rotation of the caster body 14 with respect to the spindle member 58. In the lower or lock position, the teeth 74 are positioned in the slots 86, 88, and 90 thereby maintaining the caster body 14 in a fixed position relative to the spindle member 58.

The brake means consists of a pin member 92 positioned in the caster body 14 and movable outwardly from a retracted brake-released position to a brake-applied position. The inner surface of the wheel rim 30 is provided with a plurality of circumferentially-spaced cavities 96 which can take the form of slots, holes, or similar recesses. The cavities 96 and the pin member 92 are located in the same planes so that movement of the pin member 96 out of the body 14 and into one of the cavities 96 provides for positive braking of the wheel 16.

An opening 98 is formed in the sleeve 52 communicating with the hole 54 and in the caster body 14 so as to be substantially perpendicular with respect to the axis of rotation 28 of the caster wheel 16. The pin member 92 having a hollow or depression 93 with a cam surface 93A is disposed in the opening 98 and is urged outwardly toward engagement with the wheel rim 30 by a spring 100.

A single operating member 102 functions to control both the lock member 70 and the braking pin member 92. The operating member 102 has a generally L-shaped construction with a handle portion 104 and a cylindrical shaft portion 106. A circumferential recess 108 is formed at the free end of the shaft 106. A second recess 110 is formed in the shaft 106 axially inwardly from the recess 108. The recesses 108 and 110 are circumferentially displaced from each other and have cam surfaces 108A and 110A that are also circumferentially displaced from each other.

Figure 3:
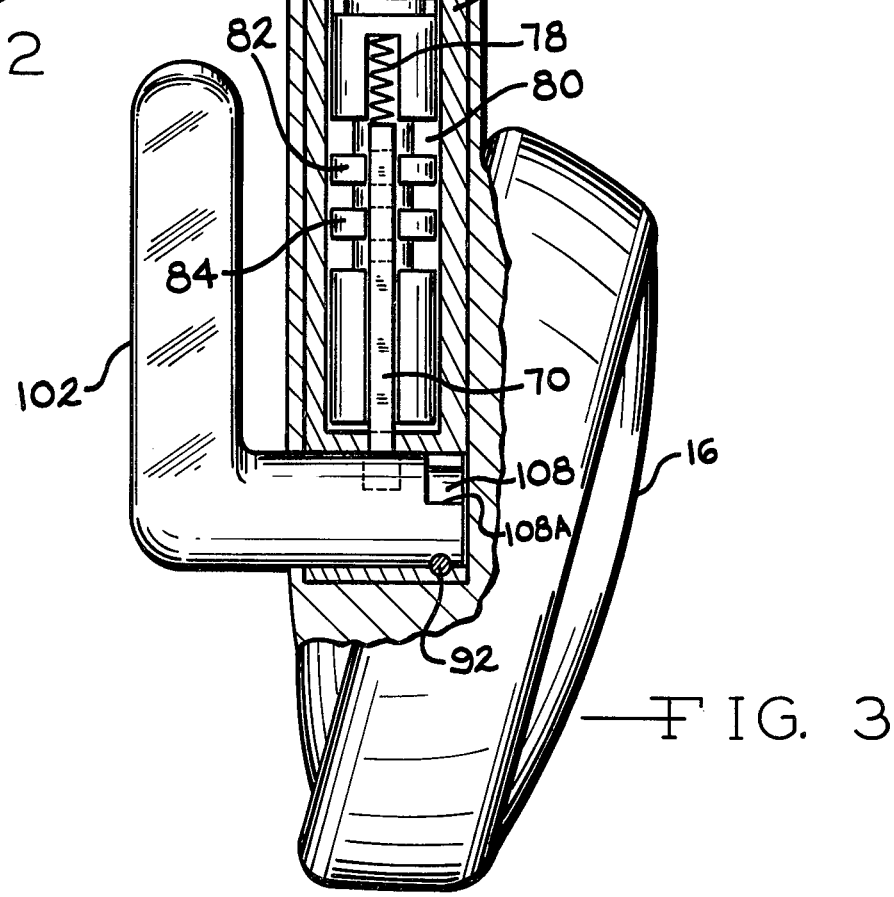
FIG. 3 is a front elevational view of the sanitary caster with a portion thereof shown in section taken substantially from line 3—3 in FIG. 4.

The shaft portion 106 is disposed in the aligned holes 54 and 56 with the recess 108 and the pin member 92 being located in substantially indentical planes and with the recess 110 and the lock member 70 also being located in common planes as can best be seen in FIG. 3.

The operating member 102 is rotatable between three operating positions. Locating means on the caster body 14 and on the operating member 102 cooperate to establish these three operating positions. The locating means comprises three circumferentially-spaced pockets 112 formed in the shaft 106. A hole 114 formed in the caster body 14 and the sleeve 50 so as to be substantially perpendicular with respect to the shaft 106 is threaded to receive a set screw 116. A spring 118 is interposed between the set screw 116 and a ball 120 to urge the ball 120 towards the shaft portion 106. Manual rotation of the operating member 102 positions the pockets 112 in alignment with the ball 120. The ball 120 is urged out of the pockets 112 against the spring 118 and is forced into another pocket indicating to the user that the operating member 102 is in a selected operating position.

Figure 5:
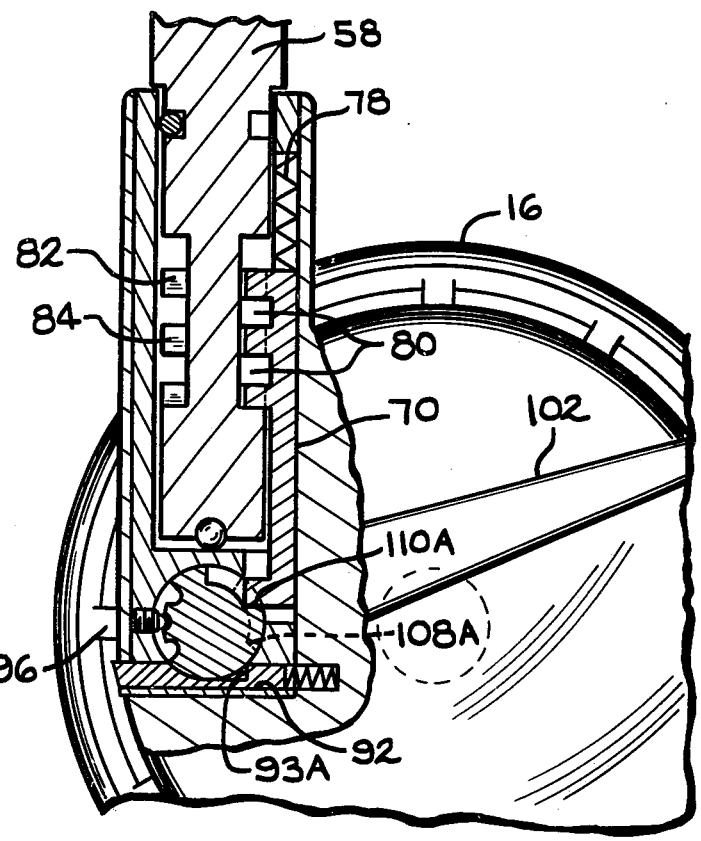
FIG. 5 is a fragmentary side elevational view like the view in FIG. 4, but showing the spindle-locking mechanism in a lock position.
Figure 4:
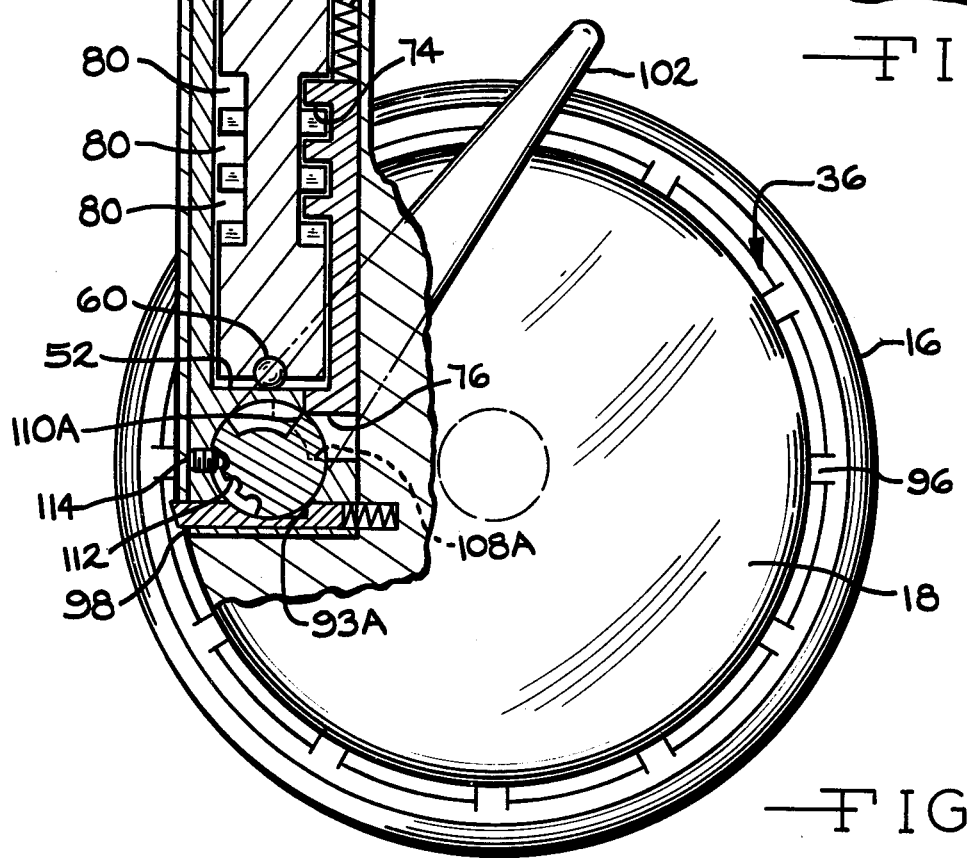
FIG. 4 is a side elevational view of the sanitary caster with a portion shown in section taken substantially from line 4—4 in FIG. 3.

FIG. 4 illustrates the caster 10 in its first operating mode, FIG. 5 illustrates the caster 10 in its second operating mode, and FIG. 6 illustrates the caster 10 in its third operating mode. The shaft portion 106 of the operating member 102 illustrated in FIGS. 4-6 is taken substantially from line A—A in FIG. 7.

In its first operating mode (FIG. 4), the operating member 102 is in its most upright position with the lock member 70 in its release position as the projecting member 76 rides on the outer surface of the shaft portion 106. Similarly, the cam surface 93A of the pin member 92 engages the outer surface of the shaft portion 106 and is maintained in its retracted, brake-released position. Since the teeth 74 are disposed in the grooves 80, the caster body 14 is freely rotatable about the spindle member 58.

As the operating member 102 is rotated clockwise as viewed in FIGS. 4 and 5 from its first position to a second position shown in FIG. 5, the recesses 108 and 110 in the shaft portion are also rotated clockwise. If the slots 86-90 are in alignment with the teeth 74 of the lock member 70, the spring 78 will urge the lock member 70 downwardly, maintaining engagement of the projection 76 with the cam surface 110A. Consequently, the teeth 74 will be disposed in the slots 86-90 and the caster body 14 will be maintained in a fixed position relative to the spindle member 58. In the second position of the operating member 102, the cam surface 93A is still in engagement with the outer surface of the shaft portion 106 to maintain the pin member 92 in its retracted, brake-released position permitting the caster wheel 16 to rotate about its axis 28. The caster 10 can therefore travel only in a straight path.

Assume that in its first operating mode, the caster body 14 is in a rotated position in which the slots 86-90 are not in alignment with the teeth 74 of the lock member 70. Again, the operating member 102 is rotated clockwise, positioning the recess 110 in vertical alignment with the projection 76 establishing a clearance to permit downward movement of the lock member 74. However, downward movement of the lock member 70 is prevented as the teeth 74 engage the ribs 82 and 84 with the lowermost tooth 74 riding on the surface 89. Rotation of the caster body 14 about the spindle member 58 is permitted so long as the teeth 74 remain out of alignment with the slots 86-90. At the predetermined rotated position of the caster body 14 with respect to the spindle member 58, where the teeth 74 of the lock member 70 are in alignment with the slots 86-90, the spring 78 will bias the lock member 70 downwardly to the lock position shown in FIG. 5.

Movement of the operating member 102 to its third operating position maintains the locked position of the lock member 70 and actuates the pin member 92 to the brake-applied position. The movement of the operating member 102 further in the clockwise direction rotates the recesses 108 and 110 further in the clockwise direction. However, further downward movement of the lock member 70 will be limited by the portion of the spindle member 58 at the bottom of the slot 90 and by engagement of the lock member 70 with the spindle member 58 at the bottom of the slot 55. Thus, as shown in FIG. 6, a clearance relationship exists between the projection 76 and the cam surface 110A.

As the operating member 102 is moved from its second operating position in FIG. 5 to its third operating position in FIG. 6, the recess 108 is rotated clockwise unitl the cam surface 108A is contacted by the cam surface 93A of the outwardly-urged pin member 92. Further rotation of the operating member 102 rotates the cam surface 108A that is followed by the can surface 93A to a position in which the pin member 92 is projected to the brake-applied position.

If a cavity 96 happens to be in alignment with the pin member 92, the pin member 92 will be urged therein positively braking the caster wheel 16. If no cavity 96 is in alignment with the pin member 92, the spring 100 will urge the pin member 92 against the inner surface of the wheel rim 30. Rotation of the wheel 16 will bring a cavity 96 into a position to receive the pin member 92 to positively lock the caster wheel 16.

Reverse operation of the operating member 102 first retracts the pin member 92 as the cam surface 108A is rotated counterclockwise against the cam surface 93A. Further counterclockwise rotation of the operating member 102 brings the cam surface 110A into contact with the projection 76 and continued counterclockwise movement of the cam surface 110A lifts the lock member 70 to its release position shown in FIG. 4 where the caster body 14 is freely rotatably about the spindle member 58.

From the above description, it can be seen that an improved sanitary caster 10 is provided. By virtue of the internal positioning of the spindle-locking and braking mechanisms and the tilted arrangement of the caster wheel 16 and the body portion 18, the introduction of foreign matter into the caster 10 is hindered while cleaning of the caster 10 is facilitated. The caster 10 requires few components to provide for effective locking of the caster body 14 relative to the spindle member 58 and positive braking of the caster wheel 16. The caster 10 is durable and is inexpensive to manufacture.

What is claimed:

1. A caster comprising a caster body having an upright bore, a spindle member pivotally mounted in said bore for rotation about an upright axis relative to said caster body, said spindle member being adapted to be fixedly secured to a mobile unit, wheel means on said caster body, cooperating axle means on said caster body and on said wheel means at a preselected vertical position on said caster for rotatably mounting said wheel means on said caster body, brake means on said caster body movable into blocking relationship with said wheel means to prevent rotation of said wheel means, spindle lock means actuatable to prevent rotation of said spindle member relative to said caster body, and an operating member operable to selectively actuate said spindle lock means and said brake means, said operating member including a handle portion movable to a plurality of pivoted positions and a shaft portion disposed in said caster body for rotation about a horizontal axis in response to pivotal movement of said handle portion, said shaft portion being positioned in said caster body at a position where the vertical height of said shaft portion is in close proximity to the vertical height of said axle means so that said handle portion is in an accessible location for foot operation between said pivoted positions, first coacting means on said shaft portion and on said brake means operable to actuate said brake means to a brake-applied position when said handle portion is moved to a first pivoted position, and second coacting means on said shaft portion and on said spindle lock means operable to actuate said spindle lock means to a spindle-locked position when said handle is in a second pivoted position.

2. A caster according to claim 1 wherein said wheel means has a plurality of spaced-apart recesses formed therein, said brake means including a brake member reciprocally movable into one of said recesses for blocking engagement with said wheel means to prevent rotation of said wheel means relative to said caster body.

3. A caster according to claim 2 wherein said spindle lock means includes a lock member movable axially with respect to said spindle member to a position engageable with said spindle member in said spindle locked position and to another position in which said lock member is in a clearance relationship with said spindle member in the release position of said spindle lock means.

4. A caster according to claim 3 wherein said lock member has teeth means extending towards said spindle member, said spindle member having circumferentially extending groove means into which said teeth means is disposed in the release position of said spindle lock means.

5. A caster according to claim 4 wherein said spindle member has formed therein axially extending slot means communicating with said groove means to receive said teeth means of said lock member in the locked position of said spindle lock means.

6. A caster according to claim 2 wherein said brake member comprises a pin member positioned in said caster body for reciprocating movement between an extended position in which said pin member is disposed in one of said recesses in the brake-applied position of said brake means and a retracted position out of blocking relationship with said wheel means in the brake-released position of said brake means.

7. A caster according to claim 3 wherein said first coacting means comprises first cam means on said shaft portion and engageable with said brake member to move said brake member to the brake-applied position, said second coacting means comprising second cam means on said shaft portion movable to a position engage said lock member.

8. A caster according to claim 7 further including first spring means urging said brake member towards said first cam means, and second spring means urging said lock member towards said second cam means.

9. A caster according to claim 6 wherein said wheel means comprise a generally cup-shaped wheel having a generally circular wheel rim terminating in an exposed edge portion, said body member having a main body portion formed to a generally biconvex configuration and having a generally circular periphery, said main body portion being inclined with respect to said bore axis, said caster wheel being rotatably mounted on said main body portion in a position in which the exposed edge portion of said wheel rim is spaced outwardly from and in general radial alignment with the periphery of said main body portion.

10. A caster according to claim 9 wherein said recesses are formed on the inner surface of said wheel rim at circumferentially spaced apart locations, each of said spaced recesses being movable to a position for receiving said extended pin member to positively restrain rotation of said caster wheel with respect to said caster body.

11. A caster according to claim 10 wherein said inner surface of said wheel rim is inclined radially outwardly of said wheel.

12. A caster according to claim 11 wherein said main body portion has a downwardly-facing side, said axle means including hub means mounted on said downwardly-facing side and an axle member on said caster wheel received in said hub means, said caster wheel having an axis of rotation that is inclined with respect to the axis of said bore.

13. A caster comprising a caster body having an upright bore with a generally vertical axis, a spindle member pivotally disposed in said bore to enable relative rotation between said spindle member and said caster body about said vertical axis, wheel means mounted on said caster body for rotation with respect to said caster body, said caster having internal brake means actuatable to restrain rotation of said wheel means with respect to said caster body, spindle lock means actuatable to restrain rotation between said spindle member and said caster body, and an operating member mounted on said caster body at a vertical position where said wheel means is mounted on said body and operatively associated with said brake means and said spindle lock means to provide for the selective actuation of said brake means and said spindle lock means, said operating member having first cam means engageable with said brake means and axially spaced second cam means engageable with said spindle lock means to provide for actuation of said brake means and said spindle lock means, said spindle lock means including a lock member axially movable with respect to said spindle member in response to engagement with said second cam means between a release position enabling relative rotation between said spindle member and said caster body and a lock position in which relative rotation between said spindle member and said caster body is restrained.

* * * * *